United States Patent
Lee, Jr. et al.

(10) Patent No.: US 6,640,143 B1
(45) Date of Patent: Oct. 28, 2003

(54) METHOD FOR PERFORMANCE MEASUREMENT AND ANALYSIS OF LOCAL EXCHANGE CARRIER INTERCONNECTIONS

(75) Inventors: R. H. Lee, Jr., Lawrenceville, GA (US); William N. Stacy, Atlanta, GA (US); Chris D. Shagnea, Jacksonville, FL (US); Sandra M. Hunt, Birmingham, AL (US); Jerry W. Moore, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/247,986

(22) Filed: Sep. 20, 2002

Related U.S. Application Data

(63) Continuation of application No. 09/474,356, filed on Dec. 29, 1999, now Pat. No. 6,480,749.
(60) Provisional application No. 60/164,682, filed on Nov. 10, 1999.

(51) Int. Cl.⁷ .......................... H04M 3/00; G06F 11/30
(52) U.S. Cl. .................... 700/32; 702/183; 379/220.01; 379/265.06
(58) Field of Search .................. 700/32; 702/183; 379/220.01, 265.06

(56) References Cited

U.S. PATENT DOCUMENTS

| | | | |
|---|---|---|---|
| 5,164,983 A | * 11/1992 | Brown et al. | 379/265 |
| 5,583,928 A | * 12/1996 | Tester et al. | 379/220 |
| 5,799,072 A | * 8/1998 | Vulcan et al. | 379/114 |
| 5,862,203 A | * 1/1999 | Wulkan et al. | 379/114 |
| 5,898,765 A | * 4/1999 | Teglovic et al. | 379/120 |
| 5,946,299 A | * 8/1999 | Blonder | 370/237 |

* cited by examiner

*Primary Examiner*—Paul P. Gordon
(74) *Attorney, Agent, or Firm*—Cantor Colburn LLP

(57) ABSTRACT

Performance measurement and analysis of local exchange carrier interconnections. Performance measurements can be used to establish that an incumbent local exchange carrier ("ILEC") is providing interconnections to one or more competitive local exchange carriers ("CLEC's") that are at least equal in quality to the interconnections provided to itself. Performance measurements are defined to measure the timeliness, accuracy and availability of the interconnections provided to the CLEC's. A performance measurement is based upon performance data that us collected from one of the ILEC's processes (preordering, ordering, provisioning, collocation, billing, maintenance and repair, emergency 911, operator service/directory assistance and trunk blockage). A performance report is defined to specify the types of performance measurements and dimensions that are included, as well as the reporting period.

15 Claims, 4 Drawing Sheets

METHOD FOR PERFORMANCE MEASUREMENT AND ANALYSIS OF LOCAL EXCHANGE CARRIER INTERCONNECTIONS

RELATED APPLICATION

This application is a continuation of U.S. patent application Ser. No. 09/474,356 filed Dec. 29, 1999 now U.S. Pat. No. 6,480,749 (hereinafter "parent application") which is incorporated herein by recreance.

The parent application was granted priority to U.S. Provisional Patent Application Ser. No. 60/164,682 entitled "A System and Method for Collecting and Analyzing Performance Measurements for Telecommunications Systems", filed Nov. 10, 1999 which is incorporated herein by reference. The present application, the parent application and the U.S. provisional patent application are commonly assigned to Bell South Intellectual Property Corporation.

TECHNICAL FIELD

This invention relates in general to the collection and analysis of data, and more particularly to collecting data to determine a performance measurement that measures an interconnection provided by a local exchange carrier.

BACKGROUND OF THE INVENTION

A local exchange carrier ("LEC") utilizes many different processes in order to serve its customers. For example, one or more processes typically supports customer ordering. Customer ordering includes the initiation of new service or the modification of existing service. Other processes support maintenance and repair and billing.

At one time, a local telephone market was served by a single LEC. However, local telephone markets now are open to competition from competitive local exchange carriers ("CLEC"). The existing or incumbent LEC ("ILEC") is required to offer quality interconnection services, resale of capacity at wholesale rates, dialing parity, number portability and unbundled access to its networks to the CLEC's. Although the ILEC is required to satisfy these requirements, there is no established method for measuring the ILEC's compliance. For example, the ILEC has a duty not to prohibit, and not to impose unreasonable or discriminatory conditions or limitations on, the resale of its telecommunications services. However, there is no well-defined method or measurement to insure that this duty is met.

The telecommunications industry and the FCC issued a notice of proposed rule making ("NPRM") that set forth some model performance measurements for measuring an ILEC's compliance. However, no rules have been promulgated. In addition, some states or public service commissions have attempted to define performance measurements, but either the performance measurements have not been enacted or the performance measurements are not well-defined. Therefore, there is a need to define performance measurements that establish that an ILEC has satisfied the requirements to provide equivalent service to a CLEC.

Once the performance measurements have been defined, then the ILEC must also determine how to collect the required data and present it in a useable format. Because the requirements to provide equivalent service to a CLEC cover a wide range of services, the ILEC must collect data from the various processes that it uses. These processes can be located on systems that are physically separate from one another. In addition, the processes can use data formats that are incompatible. In order to determine the performance measurements, the ILEC must identify the data that needs to be collected. Once the data is collected, the system must then normalize the data or transform the data into a common format so that data from multiple systems can be used to determine the performance measurements. Therefore, there is a need for a method of collecting data from a variety of systems or processes that may be incompatible with one another, normalizing the data and using the data to determine performance measurements.

Although it may be possible for the performance measurements to be determined manually, the manual collection and analysis of data greatly limits the number of measurements that can be taken. In addition, if the system is manually intensive, then it is difficult to alter the types of data that are collected or to alter the types of reports or other analysis that is generated from the data. Thus, the method for collecting, normalizing and analyzing the data should be automated. In addition, the method should be flexible so that the types of data collected and the reports generated can be easily modified.

SUMMARY OF THE INVENTION

The present invention meets the needs described above by providing a method for defining, analyzing and reporting performance measurements. The performance measurements can be used to establish that an incumbent local exchange carrier ("ILEC") is providing interconnections to one or more competitive local exchange carriers ("CLEC's") that are at least equal in quality to the interconnections provided to itself.

Typically, performance measurements are defined to measure such things as timeliness, accuracy and availability. The performance measurements can be used to compare the services provided by the ILEC to the CLEC's to the services provided by the ILEC to itself. An ILEC utilizes many different processes to serve its customers. Exemplary processes include preordering, ordering, provisioning, collocation, billing, maintenance and repair, emergency 911, operator service/directory assistance and trunk blockage.

A performance measurement is based upon a calculation that uses performance data collected from the processes. When the performance data is collected, the data is identified with one or more dimensions, such as the geography, entity, product and time dimensions. A dimension defines how a performance measurement is reported.

The method for defining, determining and reporting a performance measurement includes the steps of defining the performance measurement and defining the dimensions for the performance measurement. The method also includes defining the performance data needed to determine the performance measurement. In some instances, the performance data needed to determine a performance measurement is used for other purposes and is thus, available from the process. However, in other instances, the performance data is created or collected especially for the performance measurement. For example, a performance measurement based upon timeliness may require that the process use timestamps when such timestamps were not previously used. If timestamps are required, then the process associates a time-stamp with certain events in order to measure an interval or response time. The method also includes defining the performance reports to specify the types of performance measurements and dimensions that are included, as well as the reporting period. Preferably, the definition of the report can be easily modified to adapt to changes in the requirements, processes or user requests.

The performance data needed to determine the performance measurements is obtained and is used to determine the performance measurement. The performance measurement can be determined using a combination of dimensions. For example, a performance measurement can be calculated for a particular CLEC in a particular geographic area for a particular time period. Once the performance measurement is determined it can be included in the performance report.

A performance measurement and analysis platform ("PMAP") system supports the collection of performance data, the determination of the performance measurements and the generation of the performance reports. The PMAP system includes source systems, a staging database, a normalized operational data store, a dimensional data store database and a user interface. A number of source systems provide data to the PMAP system. Typically, the source systems correspond to the processes used by the ILEC.

Once the data is collected from the source systems, the data is loaded into a staging database and the data is filtered and normalized. The normalized operational data store is used to validate the data against business rules and data relationships and transform the data to conform to the PMAP data model. The dimensional data store database includes performance measurements which include aggregate and summary data. The PMAP system provides a variety of reporting capabilities. The reports include aggregate and CLEC-specific reports, state and regional reports, and reports directed to the different processes or subject areas.

The PMAP system also creates raw data files that contain detailed information about specific local service requests, service orders trouble tickets and other items that are typically reported. Typically, the raw data is used to recreate performance reports or to enable a user to create a custom report. A user can download raw data files, import raw data files, import raw data files into a program, such as a spreadsheet program, or manipulate the raw data to create a measurement in any of the performance reports.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a method for defining, analyzing and reporting performance measurements. The performance measurements can be used to establish that an incumbent local exchange carrier ("ILEC") is providing interconnections to one or more competitive local exchange carriers. ("CLEC's") that are at least equal in quality to the interconnections provided to the ILEC itself. Briefly described, the performance measurements measure the timeliness, accuracy and effectiveness of the interconnections provided by the ILEC. The performance measurements are determined using performance data that is collected from systems associated with the ILEC. Typically, the systems correspond to the processes used by the ILEC to support the interconnections, such as ordering and billing. The collected performance data is normalized and the data is used to determine the performance measurements. The performance measurements are reported using a variety of formats. The performance measurements for a particular CLEC can be reported or performance measurements for all CLEC's can be reported. The performance measurements for one or more CLEC's can also be compared to the performance measurements for the ILEC.

Exemplary Local Exchange Carrier Processes

Figure 1:
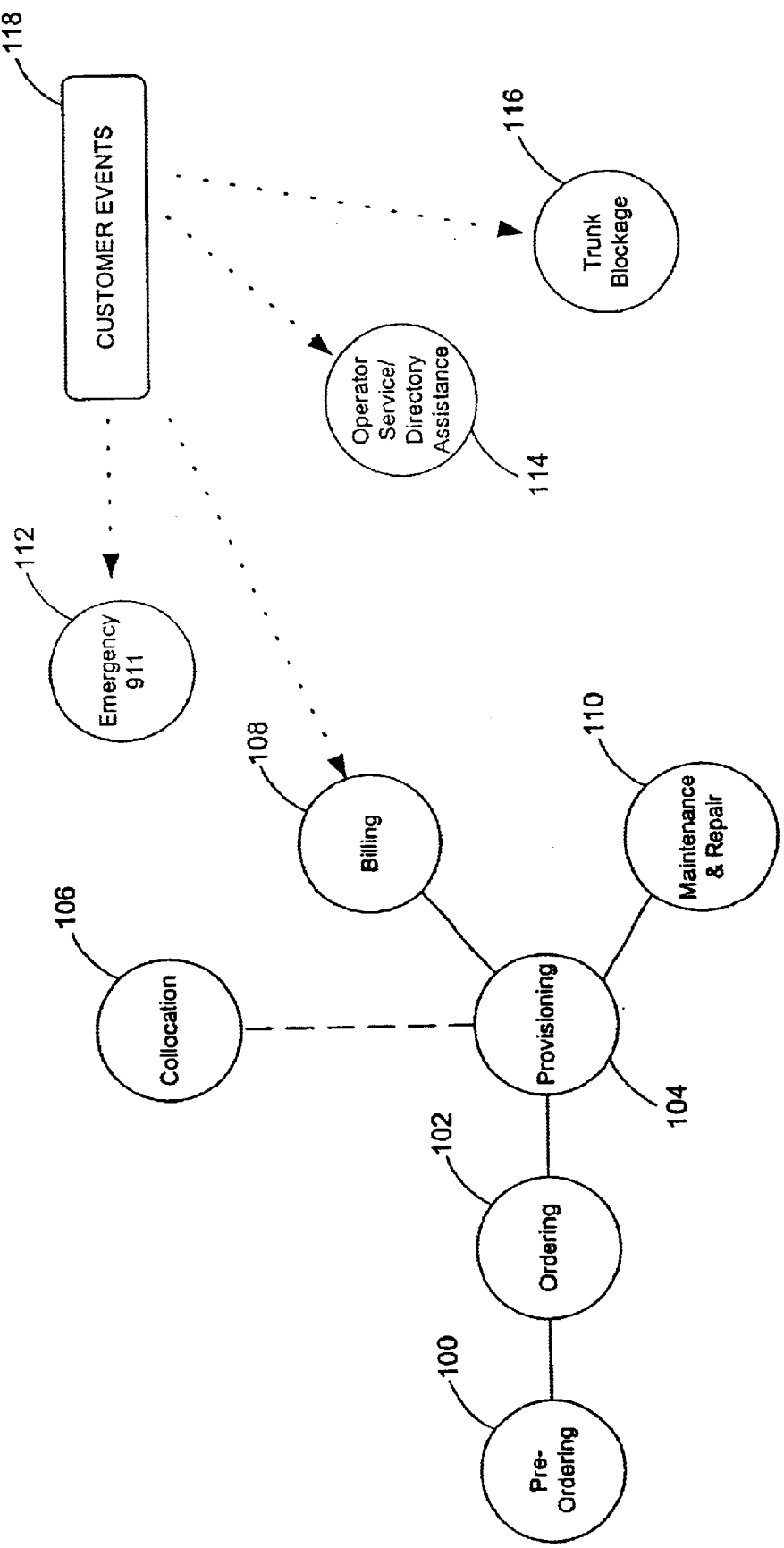
FIG. 1 is a block diagram illustrating exemplary processes, in accordance with an embodiment of the present invention.

Typically, a local exchange carrier ("LEC") utilizes many different processes to serve its customers. The exemplary processes illustrated in FIG. 1 include preordering 100, ordering 102, provisioning 104, collocation 106, billing 108, maintenance and repair 110, emergency 911 112, operator service/directory assistance 114, and trunk blockage 116. As will be apparent to those skilled in the art, different LEC's may have different processes than those illustrated by FIG. 1. Some LEC's may combine one or more of the processes illustrated in FIG. 1 into a single process or may divide a single process illustrated in FIG. 1 into multiple processes. FIG. 1 also illustrates customer events 118. The customer events interface directly with some of the processes. In FIG. 1, the customer events 118 interface with the emergency 911 112, billing 108, operator service/directory assistance 114, and trunk blockage 116 processes.

The preordering process 100 is directed to activities that occur prior to the submittal of a local service request by an LEC. These activities include verifying the customer's street address, determining available products and services, estimating the service interval and reserving a telephone number. Data validation is performed to ensure that the local service request is complete and accurate. Performance measurements directed to the preordering process include the availability of the preordering process and the response time.

The ordering process 102 begins when an LEC enters a local service request and ends when the LEC receives confirmation that an order has been created in the system. Orders may be submitted electronically or via facsimile, telephone or e-mail. Performance measurements directed to the ordering process include availability of order progress information.

The provisioning process 104 includes facilities assignment, software changes, service design, issuance of technician work orders and activation procedures. The provisioning process ends when a billing record is created for the new account, or the billing record is updated if the order is being provisioned for a change order. Performance measurements directed to the provisioning process include the timeliness of service delivery and the accuracy of. the services provided to the LEC.

The collocation process 106 includes activities related to placing customer-owned equipment in the ILEC's central office for interconnection to the ILEC's tariffed services and unbundled network elements. Performance measurements directed to the provisioning process include the timeliness of the interconnection.

The billing process 108 includes the activities associated with accumulated usage data and determining the charges to be billed to a customer's account. Performance measurements directed to the billing process include the accuracy and the timeliness of customer invoices.

The maintenance and repair process 110 includes activities directed to responding to a customer's maintenance and repair needs. The maintenance and repair process begins when a customer reports a service problem. A trouble ticket is entered to document the problem. The equipment and facilities are tested to locate the source of the trouble and once the problem is repaired, the customer is notified and the trouble ticket is closed. Performance measurements directed to the maintenance and repair process include the timeliness o f the repair and the rate of repeat problems.

The emergency 911 process 112 includes activities that support emergency 911 service. In one embodiment, the emergency 911 process includes database updates to a third party emergency 911 vendor to insure that the vendor has the most up-to-date information for providing emergency service to residents and businesses. In other embodiments, the emergency 911 process is directed to activities that include the actual provision of emergency 911 service. Performance measurements directed to the emergency 911 process include the timeliness and accuracy of the service.

The operator service/directory assistance process 114 includes activities required to provide additional services to the customer, such as directory inquires to retrieve telephone numbers. Performance measurements directed to the operator services process include the timeliness of the service.

The trunk blockage process 116 includes the collection of traffic performance data on the trunk groups in the network. Performance measurements directed to the trunk blockage process include the number of attempted calls and the number of blocked calls.

Definition of Performance Measurements

Performance measurements are defined to demonstrate that an ILEC is providing interconnections to CLEC's that are at least equal in quality to those provided by the ILEC to itself. The performance measurements typically are used to compare the services provided by the. ILEC to the CLEC's to the services provided by the ILEC to itself. In some instances a comparison is made between the ILEC and all other CLEC's. In other instances a comparison is made between the ILEC and a particular CLEC.

Performance measurements are defined to measure such things as timeliness, accuracy and availability. In the exemplary embodiment described herein, the performance measurements are defined to measure activities associated with the different processes described in the preceding section. Typically, a performance measurement is defined as a total, percentage, interval or accuracy measurement. A performance measurement that measures a total is defined to be the sum of a number of events or occurrences. For example, a flow through error analysis performance measurement associated with the ordering process is defined as the sum of errors by type.

A performance measurement that measures a percentage is defined to be an actual number divided by a total or scheduled number and multiplied by 100. For example, the missed repair appointments performance measurement associated with the maintenance and repair process is defined as follows:

Percentage of missed repair appointments=$\Sigma$(count. of customer troubles not cleared by the quoted commitment date and time)/$\Sigma$(total trouble reports closed in reporting period)×100

A performance measurement that measures an interval is defined to be an actual time interval for an event divided by the total number of events. For example, the average completion interval performance measurement associated with the provisioning process is defined as follows:

Average Completion Interval=$\Sigma$[(completion date and time)—(order issue date and time)]/$\Sigma$(total orders completed in reporting period)

A performance measurement that measures accuracy is defined to be the percentage of correct events to total events. For example, the invoice accuracy performance measurement associated with the billing process is defined as follows:

Invoice Accuracy=(total billed revenues)—(billing related adjustments)/(total billed revenues)

Exemplary performance measurements associated with the processes are summarized in the following tables. Each table corresponds to one of the previously described processes and includes the name of the performance measurements and the definition of each performance measurement. In addition, each table includes the dimensions and performance data associated with the process. The dimensions and the performance data can be associated with more than one of the performance measurements in the table.

TABLE 1

PRE-ORDERING PROCESS

| Performance Measurements | Performance Definition | Dimensions | Performance Data |
| --- | --- | --- | --- |
| Average OSS Response Interval | $\Sigma$(Date and Time of Legacy Response) − (Date and Time of Request to Legacy)]/ (Number of Legacy Requests During the Reporting Period) × 100 | Time | Number of Legacy Requests |
| OSS Interface Availability | (Functional Availability)/ (Scheduled Availability) × 100 | Geography | Summation of Response Interval |

TABLE 2

ORDERING PROCESS

| Performance Measurements | Performance Definition | Dimensions | Performance Data |
|---|---|---|---|
| Percent Flow Through Service Requests | Σ(Total number of valid service requests that flow through to the ILEC OSS)/(Total number of valid service requests delivered to the ILEC OSS) × 100 | Entity | Total Number Rejected Service Requests |
| Percent Rejected Service Requests | (Total Number of Rejected Service Requests)/Total Number of Service Requests Received) × 100 | Time | Total Number Service Requests Received |
| Reject Interval | Σ[(Date and Time of Service Request Rejection) − (Date and Time of Service Request Receipt)]/(Number of Service Requests Rejected in Reporting Period) | Geography | Date and Time of Service Request rejection |
| Firm Order Confirmation Timeliness | Σ[(Date and Time of Firm Order Confirmation) − (Date and Time of Service Request Receipt)]/(Number of Service Requests Confirmed in Reporting Period) | | Date and Time of Service Request receipt |
| Speed of Answer in Ordering Center | (Total Time in second to reach the Local Carrier Service Center)/(Total Number of Calls) in the Reporting Period | | Date and Time of Firm Order Confirmation |
| Flow Through Error Analysis | Σ of errors by type | Class of Service/ Product | Number Service Requests confirmed (in reporting period) |

TABLE 3

PROVISIONING

| Performance Measurements | Performance Definition | Dimensions | Perforrnance Data |
|---|---|---|---|
| Average Completion Interval | Σ[(Completion Date and time) − (Order Issue Date and Time)]/Σ(Count of Orders Completed in Reporting Period) | Entity | Total Service Orders Completed |
| Order Completion Interval Distribution | Σ(Service Orders Completed in "X" days)/Total Service Orders Completed in Reporting Period) × 100 | Time | Service Order Completion Date and Time |
| Mean Held Order Interval | Σ(Reporting Period Close Date − Committed Order Due Date)/Number of Orders Pending and Past the Committed Due Date) for all orders pending and past the committed due date | Geography | Service Order Issue Date and Time |
| Held Order Distribution Interval | (Number of Orders Held for ≧ "X" days)/(Total number of orders pending but not completed) × 100 | | Service Orders completed in "X" Days |
| Average Jeopardy Notice Interval | Σ(Reporting Period Close Date − Committed Order Due Date)/(Number of Orders Pending and Past the Committed Due Date) for all orders pending and past the committed due date | Class of Service/ Product | Committed Order Due Date |
| Percentage of Orders Given Jeopardy Notices | Σ[(Number of Orders Given Jeopardy Notices in Reporting Period)/(Number of Orders Committed in Reporting Period) | | Number of Service Orders Pending and Past The Committed Due Date |
| Percent Missed Installation Appointments | Σ(Number of Orders Not Complete by Committed Due Date in Reporting Period)/ (Number of Orders Completed in Reporting Period) × 100 | | Number of Service Orders Held for >=90 Days |
| Percent Provisioning Troubles within 30 days | Σ(Trouble reports on all completed orders ≦ 30 days following service order(s) completion)/(All Service Orders in a completed in the report calendar month) × 100 | | Number of Service Orders Held for >=15 Days |
| Coordinated Customer Conversions | Σ[(Completion Date and Time for Cross Connection of an Unbundled Loop) − (Disconnection Date and Time of an Unbundled Loop)]/Total Number of Unbundled Loop Items for the reporting period. | | Total Number of Service Orders Pending But Not Completed |
| Average Completion Notice Interval | Σ(Date and Time of Notice of Completion) − (Date and Time of Work Completion)/ (Number of Orders Completed in Reporting Period) | | Number of Service Orders missed in Reporting Period |

TABLE 4

COLLOCATION

| Performance Measurements | Performance Definition | Dimensions | Performance Data |
|---|---|---|---|
| Average Response Time | Σ(Request Response Date) − (Request Submission Date)/Count of Responses Returned within Reporting Period | Entity | Request Response Date & Time |
| Average Arrangement Time | Σ(Date Collocation Arrangement is Complete) − (Date Order for Collocation Arrangement Submitted)/Total Number of Collocation Arrangements Completed during Reporting Period | Time | Request Submission Date & Time |
| Percent of Due Dates Missed | Σ(Number of Orders not completed within ILEC Committed Due Date during Reporting Period)/Number of Orders Completed in Reporting Period) × 100 | Geography | Count of Requests Submitted |

TABLE 5

BILLING

| Performance Measurements | Performance Definition | Dimensions | Performance Data |
|---|---|---|---|
| Invoice Accuracy | (Total Billed Revenues during current month) − (Billing Related Adjustments during current month)/Total Billed Revenues during current month × 100 | Entity | Total Local Services billed Revenues |
| Invoice Timeliness | Σ(total number of usage records sent within six (6) calendar days from initial recording/receipt)/Σ(Total number of usage records sent) × 100 | Time | Total Adjustment Revenues |
| Usage Data Delivery Completeness | Σ(total number of usage records sent within six (6) calendar days from initial recording/receipt)/Σ(Total number of usage records sent) × 100 | Geography | Summation of Time to Transmit Invoices |
| Usage Data Delivery Timeliness | Σ(Total number of usage records sent within six calendar days from initial recording/receipt)/Σ(Total number of usage records sent) × 100 | | Total No. of Invoices |
| Usage Data Delivery Accuracy | Σ[(Total number of usage data packs sent during current month) − (Total number of usage data packs requiring retransmission during current month)]/(Total number of usage data packs sent during current month) × 100 | Class of Service/ Product | Number of Usage Data Packs Sent |

TABLE 6

MAINTENACE AND REPAIR

| Performance Measurements | Performance Definition | Dimensions | Performance Data |
|---|---|---|---|
| OSS Interface Availability | (Actual System Functional Availability)/ (Actual planned System Availability) × 100 | Entity | Total time in seconds for ILEC Repair Center Response |
| Average OSS Response Interval | (Query Response Date and Time for Category "X") − (Query Request Date and Time for Category "X")/(Number of Queries Submitted in the Reporting Period) where, "X" is 0–4, ≧4 to 10, ≧10, ≧30 seconds | Time | Total Number of Calls Received |
| Average Answer Time - Repair | (Time ILEC Repair Attendant Answers Call) − (Time of entry into queue until ACD Selection)/(Total number of calls by reporting period | Geography | Count of Customer Troubles Not Resolved by the Quoted Resolution Time and Date |
| Missed Repair Appointments | Σ(Count of Customer Troubles Not Cleared by the Quoted Commitment Date and Time)/Σ(Total Trouble reports closed in Reporting Period) × 100 | Interval Distribution | Count of Customer Trouble Tickets Closed |
| Customer Trouble Report Rate | (Count of Initial and Repeated Trouble Reports in the Current Period)/(Number of Service Access Lines in Service at End of the Report Period) × 100 | | Count of Repeated Trouble Reports in the Current Period |
| Maintenance Average Duration | Σ(Date and Time of Service Restoration) − (Date and Time Trouble Ticket was Opened)/ Σ(Total Closed Troubles in the Reporting Period | Class of Service/ Product | Number of Service Access Lines in Service at End of the Report Period |
| Out of Service ("OOS") >24 Hours | (Total Troubles OOS >24 Hours)/Total OOS Troubles in Reporting Period) × 100 | | Total Duration Time from the Receipt to the Clearing of Trouble Reports |
| Percent Repeat Troubles | (Count of Customer Troubles where more than | | Total Out of Service |

TABLE 6-continued

MAINTENACE AND REPAIR

| Performance Measurements | Performance Definition | Dimensions | Performance Data |
|---|---|---|---|
| within 30 days | one trouble report was logged for the same service line within a continuous 30 days)/ (Total Trouble Reports Closed in Reporting Period) × 100 | | Troubles |

TABLE 7

EMERGENCY 911

| Performance Measurements | Performance Definition | Dimensions | Performance Data |
|---|---|---|---|
| Timeliness | Σ(Number of batch orders processed within 24 hours + Total number of batch orders submitted) × 100 | Time | Number of Confirmed Orders |
| Accuracy | Σ(Number of record individual updates processed with no errors + Total number of individual record updates) × 100 | Geography | Number of Orders missed in Reporting Period |
| Mean Interval | Σ(Date and time of batch order completion − Date and time of batch order submission)/ (Number of batch orders completed) | | Total Number of SOIR orders for E911 Updates |

TABLE 8

OPERATOR SERVICES

| Performance Measurements | Performance Definition | Dimensions | Performance Data |
|---|---|---|---|
| Average Speed to Answer | (Total call waiting seconds)/Total calls served) | Time | Call Waiting Seconds |
| Percent Answered within "X" seconds | (Total number of calls answered within X seconds)/Total calls served) × 100 | Geography | Number of Calls served |

Note:
In some embodiments the operator services performance measurements are provided by the operator services process. No raw data is provided.

TABLE 9

TRUNK BLOCKAGE

| Performance Measurements | Performance Definition | Dimensions | Performance Data |
|---|---|---|---|
| Trunk Group Service Report | (Total number of blocked calls)/(Total number of attempted calls) × 100 | Entity | Number of Trunk Groups Measured |

Dimensions

A performance measurement is based upon performance data collected from the processes. When the performance data is collected, the data is identified with a-particular dimension. A dimension defines how a performance measurement based upon the data is reported. In the embodiment illustrated by FIG. 2, the primary dimensions include geography 200, entity 210, product 220 and time 230.

Figure 2:
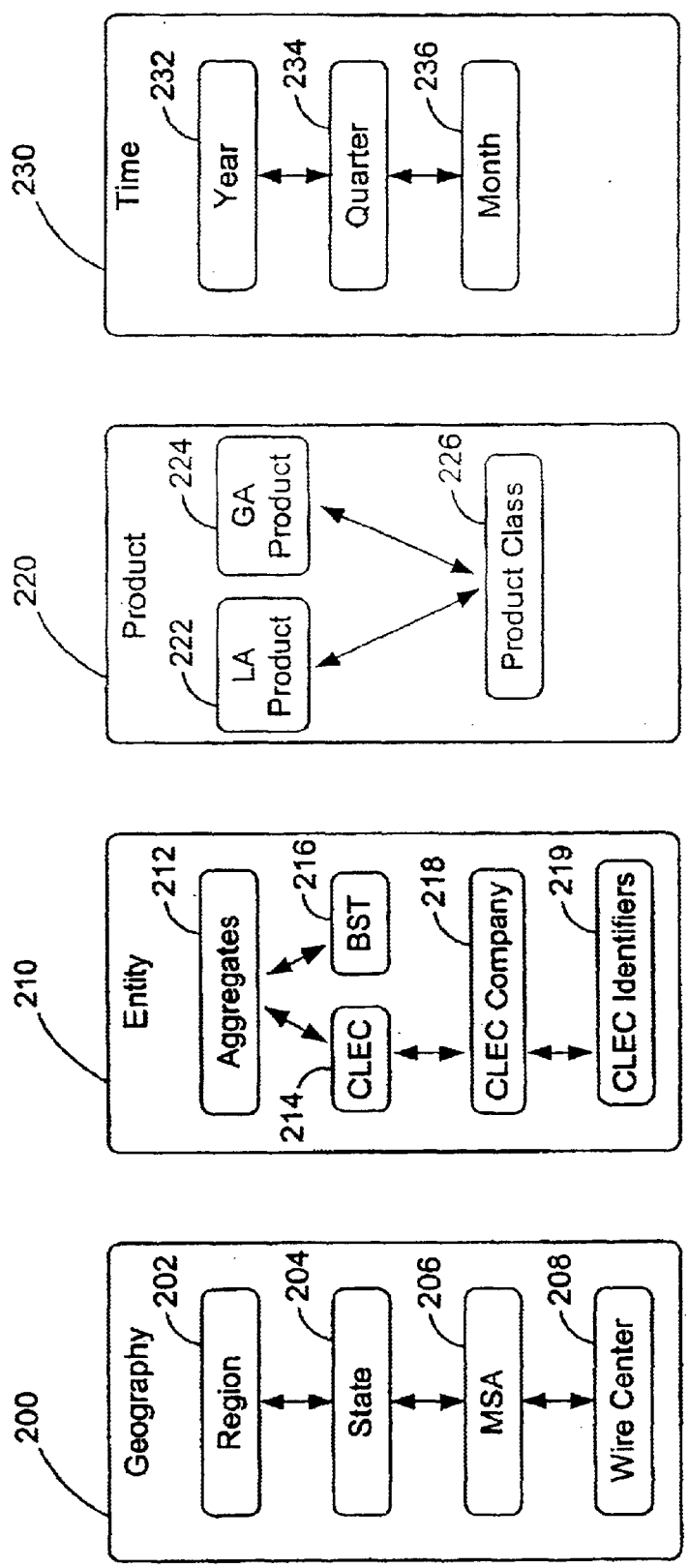
FIG. 2 is a block diagram illustrating exemplary dimensions, in accordance with an embodiment of the present information.

The geography dimension permits performance measurements to be calculated based on specific geographic criteria. The geographic criteria shown in FIG. 2 are region 202, state 204, MSA (market service area or metropolitan statistical area) 206 and wire center (or switching center) 208. The entity dimension permits performance measurements to be calculated based on a set of LEC's or a particular LEC. The entities shown in FIG. 2 include aggregate 212 (all CLEC's and the ILEC), CLEC 214 (all CLEC's), ILEC 216 (incumbent LEC), CLEC company 218 (a particular CLEC) and CLEC Identifiers 219.

The product dimension permits performance measurements to be calculated based upon specific products or services. The products shown in FIG. 2 include LA Product 222, GA Product 224 and product class 226. The time dimension permits performance measurements to be calculated based upon certain time intervals. The time dimensions shown in FIG. 2 include year 232, quarter 234 and month 236. Multiple dimensions can be used to report performance measurements. For example, a report can be based on a particular region, CLEC and year. As will be apparent to those skilled in the art, other embodiments can include alternative or additional dimensions.

As illustrated in FIG. 2, a dimension has multiple layers. If a performance report uses a particular layer of a dimension a user can obtain additional detail by accessing a different layer. For example, to obtain additional detail for a report that uses the "year" layer of the time dimension, the user can access the "quarter" layer or the "month" layer.

Method for Defining, Determining and Reporting Performance Measurement

Figure 3:
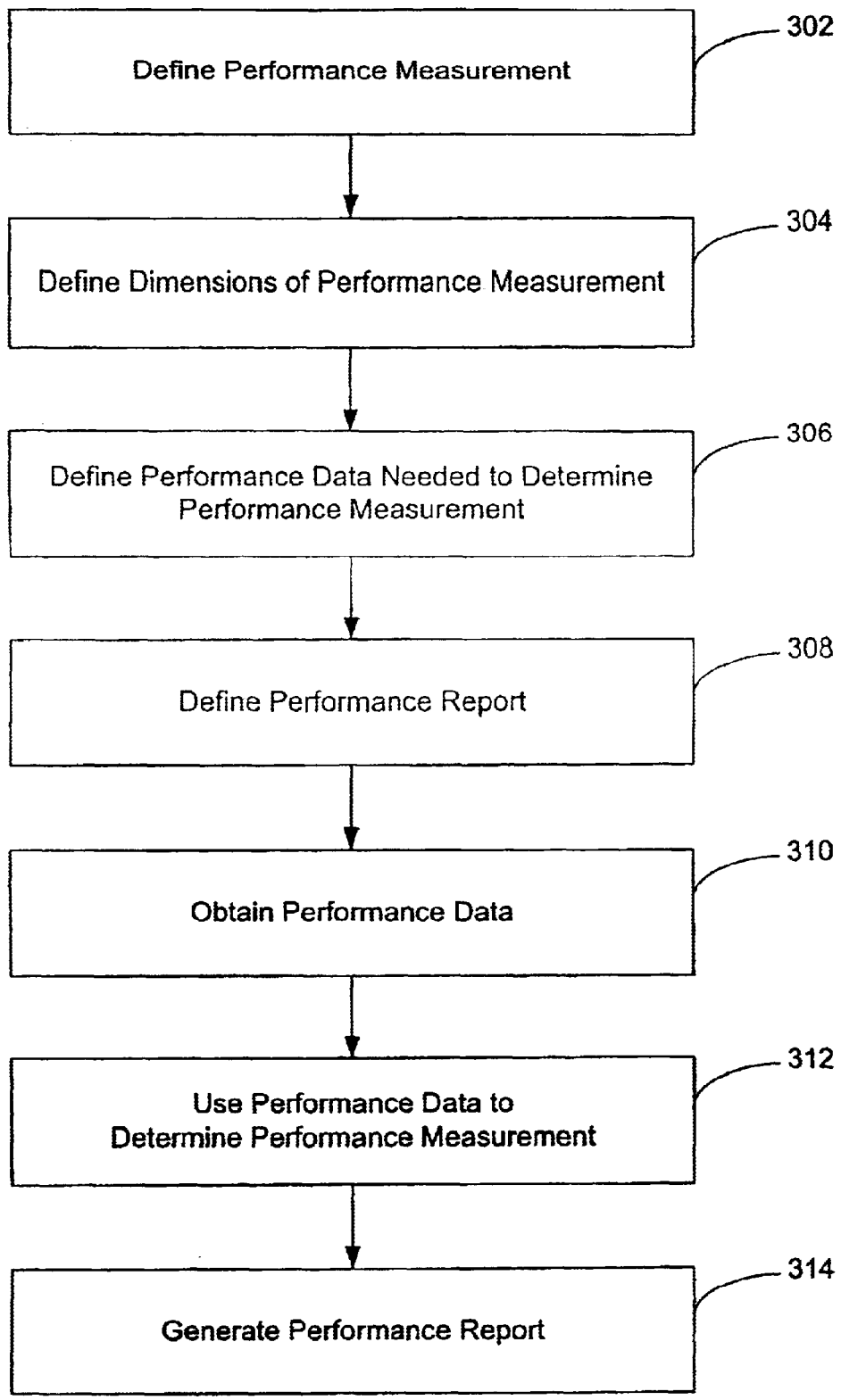
FIG. 3 is a flow chart illustrating the definition of a performance measurement, in accordance with an embodiment of the present information.

Exemplary steps for defining, determining and reporting a performance measurement are shown in FIG. 3. In step 302, the performance measurement is defined. Defining the performance measurement includes defining a quantifiable measure of an interconnection provided by the ILEC. The performance measurements are typically associated with one of the processes of the ILEC. For example, to define a performance measurement for the maintenance and repair process, a performance measurement could be defined to measure trouble reports not cleared by a committed date and time (missed repair appointments measurement, Table 6). The preceding tables include exemplary definitions of performance measurements. In step 304, the dimensions for the performance measurement are defined. For example, the dimensions for the missed repair appointments measurement includes the entity, geography, product and time dimension.

In step 306, the performance data needed to determine the performance measurement are defined. The performance data are defined by considering the definition of the performance measurement and the dimensions for the performance measurement. For example, the performance data needed to determine the missed repair appointments performance measurement are the count of customer troubles not cleared by the quoted commitment date and time and the total trouble reports closed in the reporting period. The performance data needed to determine the missed repair appointments performance measurement includes data associated with the entity, geography, product and time dimensions.

In some instances, the performance data needed to determine a performance measurement is used for other purposes and is thus, available from the process. However, in other instances, the performance data is created or collected especially for the performance measurement. For example, a performance measurement based upon timeliness may require that the process use timestamps when such timestamps were not previously used. If timestamps are required, then the process associates a timestamp with certain events in order to measure an interval or response time.

In step 308, the performance reports are defined. The performance reports are defined to specify the types of performance measurements and dimensions and the reporting period. The reports can be defined by the ILEC, a CLEC that is accessing the system or another entity. For example, if the PSC (public service commission) requires a specific type of report or a report that includes specific information, then the report can be defined to meet those requirements. Preferably, the definition of the report can be easily modified so that the report can adapt to changes in the requirements or processes or user requests.

In step 310, the performance data needed to determine the performance measurements are obtained; The performance data can be obtained from a number of different source systems associated with the different processes. Additional details about the source systems are provided in the preceding section. In step 312, the performance data is used to determine the performance measurement. A performance measurement can be determined using a combination of dimensions. For example, the percentage of missed repair appointments can be calculated for a particular CLEC in a particular geographic area for a particular quarter. In step 314 the performance measurement is included in the performance report. The performance report can be a written report or an on-line report.

Performance Measurement and Analysis Platform System

Figure 4:
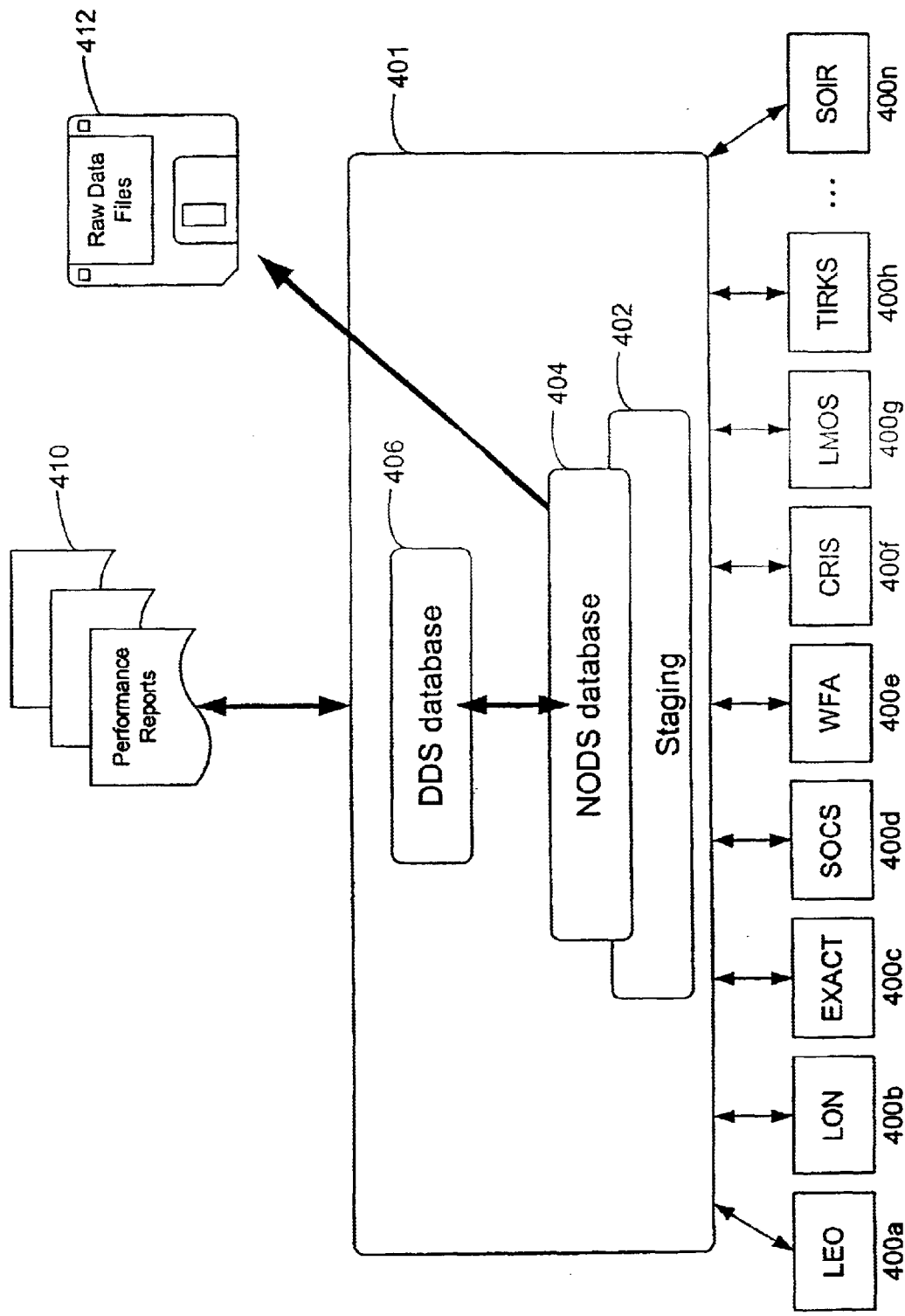
FIG. 4 is a block diagram illustrating the processing of performance data, in accordance with an embodiment of the present information.

FIG. 4 illustrates the logical layers of data that exist in the performance measurement and analysis platform ("PMAP") system 401 to support the required measurement and analysis. A number of source systems 400a, 400b . . . 400n provide data to the PMAP system. Typically, the source systems correspond to the processes previously described. The source systems can be existing legacy systems and can use data formats that are not compatible with one another.

In the exemplary embodiment illustrated by FIG. 4, the LEO system 400a is a local exchange ordering system, the LON system 400b is a local order number system, and the EXACT system 400c is an exchange access control and tracking system. The LEO, LON and EXACT systems all correspond to the ordering process. The SOCS system 400d is a service order and control system and corresponds to the provisioning process. The WFA 400e system is a work force administration system and corresponds to the maintenance and repair process.

The CRIS system 400f is a customer record information system and corresponds to the billing process. The LMOS system is a line maintenance operation system and corresponds to the maintenance and repair process. The TIRKS system 300h is a trunk integrated record keeping system and corresponds to the trunk blockage process. The SOIR system 400n is a service order information system and corresponds to the emergency 911 process. As will be apparent to those skilled in the art, alternative or additional source systems may be included. In addition, a single system may provide data for multiple processes;

The data is collected from the source systems by accessing existing databases or by retrieving the data manually. The manual retrieval of information can include receiving data via facsimile. or e-mail and may require human intervention to enter the data into the PMAP system 401.

Once the data is collected from the source systems 400a, 400b . . . 400n the data is loaded into a staging database 402. When the data is received by the staging database 402, the data is not normalized. Once in the staging database, the data is filtered and normalized. Data errors are captured and handled in the staging database.

The NODS database 404 is a normalized operational data store. In NODS, the data is validated against the business rules and data relationships and transformed to conform to the PMAP data model. Between the NODS database and the DDS database, the data undergoes an aggregation process.

The DDS database 406 is the dimensional data store database. The DDS database includes performance measurements which include aggregate and summary data. If access to detailed information is required, then the data must be accessed by drilling down into the measurement data by accessing the NODS database 404 or the raw data files 412 as described below.

The PMAP system creates raw data files 412 that contain detailed information about specific local service requests, service orders trouble tickets and other items that are typically reported. Typically, the raw data is used to recreate performance reports or to enable a user to create a custom report. A user can download raw data files, import raw data files, import raw data files into a program, such as a spreadsheet program or manipulate the raw data to create a measurement in any of the performance reports.

The PMAP system 401 provides a variety of reporting capabilities. The reports 410 include aggregate and CLEC-specific reports, state and regional reports, and reports directed to the different processes or subject areas. In one embodiment, the reports can be accessed via a network, such as the Internet. Typically, a user is provided with a user ID and a password in order to access the reports (and the raw data). A user generally is permitted to access reports and data related to all CLEC's and the CLEC associated with the user, but generally is not permitted to access reports and data related to another CLEC. A user associated with the incumbent LEC can be provided with broader access to the data. As will be apparent to those skilled in the art, other types of reports and other methods of reporting can also be used with the PMAP system 401.

Additional alternative embodiments will be apparent to those skilled in the art to which the present invention pertains without departing from its spirit and scope. For example, additional or alternative performance can be used or the definition of the performance measurements described can be modified. Accordingly, the scope of the present invention is described by the appended claims and is supported by the foregoing description.

What is claimed is:

1. A method for comparing a service provided to a first local exchange carrier and a second local exchange carrier, comprising:
    collecting a first set of performance data associated with the service provided to the first local exchange carrier;
    normalizing the first set of performance data to determine a first performance measurement;
    collecting a second set of performance data associated with the service provided to the second local exchange carrier;
    normalizing the second set of performance data to determine a second performance measurement; and
    comparing the first performance measurement and the second performance measurement to compare the service provided to the first local exchange carrier with the service provide to the second local exchange carrier.

2. The method of claim 1, wherein the first set of performance data and the second set of performance data are collected from process associated will first local exchange carrier.

3. The method of claim 1, wherein the first performance measurement and the second performance measurement measure timeliness.

4. The method of claim 1, wherein the first performance measurement and the second performance measurement measure accuracy.

5. The method of claim 1, wherein the first performance measurement and the second performance measurement measure availability.

6. A method for determining a performance measurement, comprising:
    collecting a first set of performance data associated with a first local exchange carrier;
    normalizing the first set of performance data to determine the performance measurement for the first local exchange carrier; and
    providing the performance measurement for the first local exchange carrier.

7. The method of claim 6, wherein providing the performance measurement for the first local exchange carrier comprise:
    providing the performance measurement for the first local exchange carrier via a network.

8. The method of claim 6, further comprising:
    collecting a second set of performance data associated with a second local exchange carrier; and
    normalizing the second set of performance data to determine the performance measurement for the second local exchange carrier.

9. The method of claim 8, further comprising:
    comparing the performance measurement for the first local exchange carrier and the performance measurement for the second local exchange carrier.

10. The method of claim 8, wherein the first local exchange carrier is an incumbent local exchange carrier and the second local exchange carrier is a competitive local exchange carrier.

11. A method for collecting and analyzing performance data, comprising:
    collecting performance data for a first local exchange carrier from a process associated with the first local exchange carrier;
    normalizing the performance data for the first local exchange carrier to determine a performance measurement for the first local exchange carrier;
    collecting performance data for a second local exchange carrier from the process associated with the first local exchange carrier;
    normalizing the performance data for the second local exchange carrier to determine a performance measurement for a second local exchange carrier, and
    providing the performance measurement for the first local exchange carrier and the performance measurement for the second local exchange carrier.

12. The method of claim 11, wherein the first local exchange carrier is an incumbent local exchange carrier and the second local exchange carrier is a competitive local exchange carrier.

13. The method of claim 11, wherein the performance measurement for the first local exchange carrier and the performance measurement for the second local exchange carrier measure timeliness.

14. The method of claim 11, wherein the performance measurement for the first local exchange carrier and the performance measurement for the second local exchange carrier measure accuracy.

15. The method of claim 11, wherein the performance measurement for the first local exchange carrier and the performance measurement for the second local exchange carrier measure availability.

* * * * *